United States Patent [19]

Doshak et al.

[11] 4,431,765

[45] Feb. 14, 1984

[54] FREE FLOWING POLYBUTADIENE RESIN PARTICLES AND PROCESS FOR THE PREPARATION THEREOF

[75] Inventors: John M. Doshak, Akron; Mark R. Roodvoets, Munroe Falls; Adel F. Halasa, Bath, all of Ohio

[73] Assignee: The Firestone Tire & Rubber Company, Akron, Ohio

[21] Appl. No.: 217,624

[22] Filed: Dec. 18, 1980

[51] Int. Cl.$^3$ .......................... C08K 3/22; C08K 3/36; C08K 7/20

[52] U.S. Cl. .................................... 524/426; 524/571; 524/433; 524/437; 524/444; 524/445; 524/449; 524/450; 524/451

[58] Field of Search ............... 260/42.47, 42.32, 42.37, 260/42.38; 524/552, 571, 426

[56] References Cited

U.S. PATENT DOCUMENTS

| | | | |
|---|---|---|---|
| 3,769,256 | 10/1973 | Yoshimoto et al. | 260/41.5 A |
| 3,821,158 | 6/1974 | Westermann et al. | 260/42.32 |
| 3,835,075 | 9/1974 | Boutsicaris et al. | 260/42.32 |
| 3,852,225 | 12/1974 | Ishikawa et al. | 260/42.32 |
| 3,912,685 | 10/1975 | Gintz | 260/42.32 |
| 3,925,275 | 12/1975 | Musashi et al. | 260/42.37 |
| 3,998,778 | 12/1976 | Berg et al. | 260/33.6 AQ |
| 4,073,755 | 2/1978 | Berg et al. | 260/17.4 BB |

*Primary Examiner*—John C. Bleutge
*Assistant Examiner*—Robert E. L. Sellers
*Attorney, Agent, or Firm*—Daniel N. Hall

[57] ABSTRACT

The invention herein is directed toward a process of preparing free flowing thermoset resin particles of polybutadiene and includes the steps of physically mixing a filler material with polybutadiene followed by chopping the mixture into small particles or granules which are irregularly shaped. A vulcanizing agent can be added during the mixing step as well as other ingredients commonly added to polybutadiene resin formulations, as is customarily done in the art, without affecting the free flowing properties of the polybutadiene treated according to the process of this invention.

10 Claims, No Drawings

FREE FLOWING POLYBUTADIENE RESIN PARTICLES AND PROCESS FOR THE PREPARATION THEREOF

TECHNICAL FIELD

The present invention is directed toward a process for improving the handling characteristics of thermoset resins such as high vinyl, high molecular weight polybutadiene. The invention also provides novel, free flowing polybutadiene resins. Known bulk molding compounds comprise a filler material and high molecular weight polybutadiene, the latter having a number average molecular weight of at least 100,000 and higher, and having a high vinyl content. These compounds are usually sold in the form of logs and require special handling and feeding equipment for extrusion or injection molding apparatus. Although such materials can be milled to a crumb-like consistancy, they are not free from cold flow and therefore the particles will tend to agglomerate upon standing.

It is well known in the prior art that low molecular weight polybutadienes, those having a number average molecular weight of 5000 to 20,000, are also useful thermoset resins for processing of rubber articles. However, a major drawback to their use has been that they are putty or dough-like in character with a high degree of tack and even when compounded with a filler they cannot be injection molded unless special feeding equipment is employed.

BACKGROUND ART

Free flowing resin particles are particularly useful in injection molding apparatus which employ a hopper to feed an extruder. While some mechanical agitation can be employed, the resin particles generally fall into a heating zone by gravity. Many patents exist which disclose free flowing resin or polymer particles as well as processes for making the same. One of these is U.S. Pat. No. 3,769,256 which is directed toward an unvulcanized rubber composition comprising a styrene-butadiene copolymer and from about 5 to 200 parts of hydrous silica. The composition possesses a high tensile strength prior to vulcanization and is processable by conventional methods including injection molding, extruding and the like. In order to provide the increase in unvulcanized tensile strength, the patent teaches hydrogenation of the copolymer, styrene-butadiene, and the addition of fillers.

U.S. Pat. Nos. 3,998,778 and 4,073,755 provide respectively for finely divided, powdered elastomers such as polybutadiene and the process for preparing the same. The particles are the result of solution polymerization of butadiene which is thereafter emulsified. An aqueous suspension of carbon black is added followed by an aqueous sodium silicate solution. The examples disclosed report the use of polybutadiene solutions having a vinyl content of only about 35 percent, the disclosed range being only 15 to 75 percent. Powdered particles, although free flowing, are not always desirable inasmuch as they provide quantities of dust effecting waste of material as well as pollution problems.

Thus, none of the patent literature known to us provides a high vinyl, high molecular weight polybutadiene resin in a granular free flowing form. Nor, is a process disclosed wherein a free flowing nature can be imparted to the polymer.

DISCLOSURE OF THE INVENTION

The polybutadiene resin of the present invention comprises a high molecular weight, high vinyl polybutadiene and up to about 400 parts of a filler material, per 100 parts of rubber. The process of the present invention provides for forming free flowing polybutadiene thermoset resins by adding to a high molecular weight, high vinyl polybutadiene up to about 400 parts of a filler material, per 100 parts rubber, mixing the polybutadiene resin with the filler to form a blend, and chopping the blend into small particles.

The polybutadiene selected for practice of the present invention has a number average molecular weight of from about 100,000 to about 500,000 and has a vinyl content of from about 90 to 100 percent. Suitable filler materials are selected from the group consisting of graphite, carbon black, silica, mica, calcium carbonate, clay, talc, hydrated alumina, atomite, perlite, magnesia, pumice, glass spheres, fibrous reinforcement, combined rubber and filler materials and mixtures thereof.

PREFERRED MODE FOR CARRYING OUT THE INVENTION

The process of the present invention includes the step of physically mixing a filler material with the polybutadiene (PBd) followed by the step of chopping the mixture into small particles or granules which are irregularly shaped and approximately 1.6 mm along their greatest dimension. During mixing, a vulcanizing agent such as a peroxide or sulfur can be added as well as other ingredients commonly added to PBd resin formulations as is customarily done in the art. Neither the presence nor the absence of these additional components will effect the free-flowing properties of the PBd treated according to the process of this invention.

The polybutadiene employed has a high molecular weight as well as a high vinyl content. Number average molecular weight of the polybutadiene ranges from about 100,000 to 500,000 and the vinyl content is at least 90% and is preferably 98 to 100%. Polybutadiene with these properties can be prepared by polymerizing butadiene in a suitable solvent, such as hexane, with an organolithium initiator, e.g., n-butyllithium. In order to obtain the high vinyl content, a modifier such as dipiperidyl ethane or 1,2-di-(N-methylpiperzinyl-N')-ethane is added following addition of the initiator.

A high vinyl polybutadiene, suitable for practice of the present invention, was prepared as follows: A cleaned 7.57 liter stainless steel reactor equipped with stirrer, appropriate heating and cooling means, and appropriate inlets and outlets was filled under a nitrogen atmosphere with hexane to which was added n-butyllithium in an amount sufficient to react with impurities in the hexane and on the surface of the reactor. The mixture was stirred and heated to 65° C. for about an hour, subsequently drained under a nitrogen atmosphere, and then discarded. After thus preparing the reaction vessel, 2.8 Kg of a blend containing 24% 1,3-butadiene (817 gms butadiene) and 76% of hexane was charged to the reactor under nitrogen and cooled to 5° C. before adding 16.5 millimoles of n-butyllithium as an initiator and 33 millimoles of 1,2-di-(N-methylpiperzinyl-N')-ethane (DMPE) as a modifier. The temperature was maintained at 5° C. and efficient stirring effected. After about eight hours of reaction, the product was dropped into a large volume of isopropanol containing an antioxidant. The precipitated product was recovered and drum-dried to give substantially 100% yield of a polymer having a number average molecular weight of about 50,000 and a 1,2 content of substantially 100%.

The molecular weight can be increased by decreasing the amount of n-butyllithium and decreased by increasing the amount of n-butyllithium, advantageously with appropriate changes in the amount of DMPE to give a DMPE/Li ratio of approximately 2. This method of varying or controlling the molecular weight by varying the amount of catalyst used per mole of monomer is well known in the anionic polymerization art.

The polymerization temperature has an effect on the 1,2 content of the product with increase in temperature within limits decreasing the 1,2 content, and vice versa within limits. It is generally desirable to maintain a temperature no higher than 5° C. to obtain maximum 1,2 content which will usually be 100 percent. While the present invention does not include the preparation of a high vinyl polybutadiene, the foregoing synthesis has been included in order for those skilled in the art to have at least one high vinyl polymer with which to practice.

With respect to the filler material, it can be employed in varying amounts ranging from as little as 50 to as much as 400 parts per 100 parts of the PBd by weight (phr) depending upon the filler selected. Some of the filler materials useful for the practice of the present invention include fibrous reinforcement such as fiberglass, graphite fibers and wollastonite, silica, graphite, carbon black, mica and various known nonreinforcing filler materials such as clay, talc, glass spheres, hydrated alumina, atomite, calcium carbonate, magnesia, pumice, perlite and the like. A combined rubber and fiber filler can also be employed such as Santoweb D in amounts of from about 10 to 200 phr.

With respect to the vulcanizing agent, a peroxide, such as Vulcup R can be employed in amounts of from about 0.25 to about 4 phr or sulfur can be employed in amounts of from about 5 to about 100 phr. As will be understood by those skilled in the art, when lower amounts of sulfur are utilized it may be desirable or necessary to add an accelerator.

With more specific respect to the amounts of fillers employed, fibrous reinforcement can range from about 10 to 235 phr; silica and calcium carbonate can range from about 40 to 400 phr; graphite and carbon black, from about 50 to 400 phr; and nonreinforcing fillers, from about 50 to 400 phr.

For the examples reported in Table I, PBd, having a number average molecular weight of 230,000 was filled with several of the materials disclosed herein. The process involved the addition of the PBd and filler material to a suitable mixing apparatus, such as a Brabender mixer. A small amount of a peroxide vulcanizing agent, on the order of 1 to 4 phr was also added and mixing was conducted for about five minutes at 127° C. Following mixing, the batch was chopped into small particles on a Wiley Mill. Several of the examples were cured at 182° C. for 10 minutes and thereafter tested for flexural strength and modulus. A control does not appear in Table I inasmuch as when the PBd containing no filler material was cured, the product became very brittle and glass-like. While it appeared to be strong, its brittle nature made it impossible to test in the manner that the filled specimens were tested.

TABLE I

| Addition of Fillers to High Molecular Weight High Vinyl PBd | | | | | | |
|---|---|---|---|---|---|---|
| Example No. | PBd Mole. Wt. | Filler | Amount phr | Vulcanizing Agent phr[a] | Flexural Strength MPa | Flexural Modulus MPa |
| 1 | 230,000 | Graphite | 200 | 1 | 12.56 | 993.6 |
| 2 | 230,000 | Graphite | 200 | 3 | 17.60 | 1,890.6 |
| 3 | 230,000 | Graphite | 200 | 2 | 31.88 | 4,761.0 |
| 4 | 230,000 | Graphite | 200 | 4 | 38.64 | 4,823.1 |
| 5 | 230,000 | Graphite | 250 | 3 | 19.78 | 1,407.6 |
| 6 | 230,000 | Graphite | 300 | 3 | 28.91 | 4,188.3 |
| 7 | 230,000 | Silica | 200 | 3 | 20.15 | 1,269.6 |

[a]Vulcup R

As can be seen from the data in Table I, all the PBd specimens filled with graphite or silica had good flexural properties. The milled particles, prior to curing were totally tack-free and could readily be poured.

Also reported herein are Examples 8–26 in Table II wherein other fillers were added to various molecular weight polybutadienes. Examples 8 through 12 provide for the addition of fiberglass as a filler; Examples 13 and 14 provide carbon black as the filler; Examples 15 and 16 provide calcium carbonate as the filler; and Examples 17–26 provide a rubber-synthetic fiber blend as the filler, Examples 21–26 further carrying some calcium carbonate as a second filler. Vulcanizing agents employed and their respective amounts have also been provided.

TABLE II

| Additions of Fillers and Polymers to High Molecular Weight High Vinyl PBd | | | | | | | |
|---|---|---|---|---|---|---|---|
| Example No. | PBd Mole. Wt. | Vulcanizing Agent | Amount phr | Filler | Amount phr | Secondary Filler | Amount phr |
| 8 | 200,000 | Vulcup R | 2.57 | Fiberglass[a] | 260 | — | — |
| 9 | 400,000 | Vulcup R | 1.00 | Fiberglass[b] | 240 | — | — |
| 10 | 400,000 | Vulcup R | 2.00 | Fiberglass[b] | 200 | — | — |
| 11 | 400,000 | Vulcup R | 3.00 | Fiberglass[b] | 200 | — | — |
| 12 | 200,000 | Vulcup R | 0.25 | Fiberglass[c] | 12 | — | — |
| 13 | 100,000 | Sulfur | 75.00 | Carbon Black | 25 | — | — |
| 14 | 100,000 | Sulfur | 50.00 | Carbon Black | 25 | — | — |
| 15 | 100,000 | Sulfur | 75.00 | $CaCO_3$ | 25 | — | — |
| 16 | 100,000 | Sulfur | 50.00 | $CaCO_3$ | 25 | — | — |
| 17 | 200,000 | Vulcup R | 0.25 | Santoweb D[d] | 10 | — | — |
| 18 | 200,000 | Vulcup R | 0.25 | Santoweb D[d] | 20 | — | — |
| 19 | 200,000 | Vulcup R | 1.00 | Santoweb D[d] | 30 | — | — |
| 20 | 200,000 | Vulcup R | 1.00 | Santoweb D[d] | 40 | — | — |
| 21 | 200,000 | Vulcup R | 1.00 | Santoweb D[d] | 20 | $CaCO_3$[e] | 20 |
| 22 | 200,000 | Vulcup R | 1.00 | Santoweb D[d] | 20 | $CaCO_3$ | 40 |
| 23 | 200,000 | Vulcup R | 1.00 | Santoweb D[d] | 40 | $CaCO_3$ | 20 |
| 24 | 200,000 | Vulcup R | 1.00 | Santoweb D[d] | 40 | $CaCO_3$ | 40 |

TABLE II-continued

Additions of Fillers and Polymers to High Molecular Weight High Vinyl PBd

| Example No. | PBd Mole. Wt. | Vulcanizing Agent | Amount phr | Filler | Amount phr | Secondary Filler | Amount phr |
|---|---|---|---|---|---|---|---|
| 25 | 200,000 | Vulcup 40KE | 3.00[e] | Santoweb D[d] | 70 | — | — |
| 26 | 200,000 | Vulcup 40KE | 5.00[e] | Santoweb D[d] | 70 | — | — |

[a]Continuous strand
[b]5 cm length
[c]4.75 mm length
[d]Rubber-fiber blend
[e]40% Vulcup R on $CaCO_3$ The products of Examples 8–26 were chopped as reported for Example 1 and were all found to possess a free flowing nature even after several months of standing. Generally, the fiberglass filled resins had very high flexural strength and modulus; the silica, calcium carbonate and graphite filled resins had high modulus; the Santoweb D filled resins had improved impact strength; and all had high heat distortion temperatures.

Based upon these results, it is apparent that the process of the present invention is useful to convert high molecular weight high vinyl polybutadiene resin from a rubbery, cohesive mass into small, granular or irregularly shaped particles that are readily pourable and which have high flexural modulus and strength properties. By mixing the polybutadiene thus obtained with other polymers including other thermosets, the latter could also be made more free flowing.

It is to be understood that variations of the disclosure fall within the scope of the claimed invention and that the subject invention is not to be limited by the examples set forth herein. They have been provided merely to provide a demonstration of operability and therefore the selection of fillers can be determined without departing from the spirit of the invention herein disclosed and described. Moreover, the scope of the invention shall include all modifications and variations that fall within the scope of the attached claims.

We claim:

1. A process for forming free flowing polybutadiene thermoset resins that are free flowing and resistant to cold flow at ambient temperatures comprising the steps of:
    adding to a high molecular weight polybutadiene, having a 1,2-vinyl content of at least 90 percent, an amount of a filler material up to about 400 parts per 100 parts rubber, said amount being sufficient to render said resin free flowing and resistant to cold flow;
    mixing said polybutadiene resin with said filler to form a blend; and
    chopping said blend into small particles.

2. A process for forming free flowing polybutadiene thermoset resins as set forth in claim 1, wherein said polybutadiene has a number average molecular weight of from about 100,000 to about 500,000 and has a vinyl content of from about 90 to 100 percent.

3. A process for forming free flowing polybutadiene thermoset resins as set forth in claim 1, wherein said filler material is selected from the group consisting of graphite, carbon black, silica, mica, calcium carbonate, clay, talc, hydrated alumina, atomite, perlite, magnesia, pumice, glass spheres, and mixtures thereof and is employed in amounts of from about 50 to 400 parts per 100 parts rubber.

4. A process for forming free flowing polybutadiene thermoset resins as set forth in claim 1, wherein said filler material is selected from the group consisting of fibrous reinforcement materials and is employed in amounts of from about 10 to about 400 parts per 100 parts rubber.

5. A process for forming free flowing polybutadiene thermoset resins as set forth in claim 1, wherein said polybutadiene has a number average molecular weight of 230,000, said filler is graphite and is present in an amount of from 200 to 300 parts per 100 parts rubber.

6. A process for forming free flowing polybutadiene thermoset resins as set forth in claim 1, wherein said polybutadiene has a number average molecular weight of 230,000, said filler is silica and is present in an amount of 200 parts per 100 parts rubber.

7. A process for forming free flowing polybutadiene thermoset resins as set forth in claim 1, wherein said polybutadiene has a number average molecular weight of 100,000, said filler is carbon black and is present in an amount of 25 parts per 100 parts rubber.

8. A process for forming free flowing polybutadiene thermoset resins as set forth in claim 1, wherein said polybutadiene has a number average molecular weight of 100,000, said filler is calcium carbonate and is present in an amount of 25 parts per 100 parts rubber.

9. A process for forming free flowing polybutadiene thermoset resins as set forth in claim 1, further comprising from about 20 to 40 parts per 100 parts rubber of calcium carbonate.

10. A process for forming free flowing polybutadiene thermoset resins as set forth in claim 1, wherein said polybutadiene resin has a number average molecular weight range of from about 200,000 to 400,000, said filler is fiberglass and is present in an amount of from about 10 to 235 parts per 100 parts rubber.

* * * * *